United States Patent
Watanabe

(10) Patent No.: US 12,436,209 B2
(45) Date of Patent: Oct. 7, 2025

(54) MAGNETIC SENSOR, ELECTRIC CONTROL DEVICE, CORRECTION METHOD, AND MAGNETIC SENSOR MANUFACTURING METHOD

(71) Applicant: TDK Corporation, Tokyo (JP)

(72) Inventor: Kazuya Watanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 134 days.

(21) Appl. No.: 17/989,818

(22) Filed: Nov. 18, 2022

(65) Prior Publication Data
US 2023/0176147 A1 Jun. 8, 2023

(30) Foreign Application Priority Data
Dec. 6, 2021 (JP) .................................. 2021-197456

(51) Int. Cl.
G01R 33/09 (2006.01)
G01R 33/00 (2006.01)

(52) U.S. Cl.
CPC ......... *G01R 33/09* (2013.01); *G01R 33/0023* (2013.01)

(58) Field of Classification Search
CPC ............... G01R 33/09; G01R 33/0023; G01R 33/0029; G01R 33/0035; G01R 33/098; G01R 33/093; G01R 33/091; G01R 33/0017; G01R 35/005
See application file for complete search history.

(56) References Cited

U.S. PATENT DOCUMENTS

| | | | | |
|---|---|---|---|---|
| 6,304,074 B1 * | 10/2001 | Waffenschmidt | ...... | G01R 33/09 324/202 |
| 9,245,547 B1 | 1/2016 | Latham et al. | | |
| 2011/0057650 A1 * | 3/2011 | Hellwig | ............... | G01R 33/072 324/252 |
| 2017/0356967 A1 * | 12/2017 | Romero | ............ | G01R 33/0029 |
| 2018/0275215 A1 | 9/2018 | Uchida et al. | | |
| 2019/0195969 A1 | 6/2019 | Watanabe | | |
| 2019/0339337 A1 * | 11/2019 | Sharma | ................ | G01R 33/098 |
| 2020/0116801 A1 * | 4/2020 | Watanabe | ............... | G01R 33/07 |
| 2020/0256933 A1 * | 8/2020 | Saruki | ..................... | G01D 3/022 |
| 2022/0179013 A1 * | 6/2022 | Deligiannis | ............ | G01R 33/09 |
| 2022/0333951 A1 * | 10/2022 | Diaconu | .................. | G01B 7/30 |

FOREIGN PATENT DOCUMENTS

JP 2018159692 A 10/2018
JP 2019-117184 A 7/2019

* cited by examiner

*Primary Examiner* — Lee E Rodak
*Assistant Examiner* — Demetrius R Pretlow
(74) *Attorney, Agent, or Firm* — Posz Law Group, PLC

(57) ABSTRACT

A magnetic sensor comprises a magnetic detection unit that outputs a signal by applying a magnetic field, and a signal correction unit that corrects the signal output from the magnetic detection unit. The magnetic detection unit includes a magnetoresistive effect element having a predetermined sensitivity axis. The signal correction unit generates a corrected signal by correcting the signal using a correction value capable of reducing the distortion error included in the signal output from the magnetic detection unit when the magnetic field having an intersecting direction that obliquely intersects the sensitivity axis is applied to the magnetoresistive effect element.

17 Claims, 6 Drawing Sheets

MAGNETIC SENSOR, ELECTRIC CONTROL DEVICE, CORRECTION METHOD, AND MAGNETIC SENSOR MANUFACTURING METHOD

CROSS-REFERENCE TO RELATED APPLICATION

This application claims priority from Japanese Patent Application No. 2021-197456 filed on Dec. 6, 2021, the entire contents of which are incorporated herein by reference.

BACKGROUND

The present disclosure relates to a magnetic sensor, an electric control device using the same, a magnetic sensor output signal correction method and a magnetic sensor manufacturing method.

In recent years, position detection devices for detecting the position, movement amount (change amount), orientation, and the like, of a moving body due to linear movement have been used in various applications. As a position detection device, one equipped with a magnetic sensor unit that outputs a signal by an applied magnetic field has been known. As the magnetic sensor unit, one has been suggested that is a laminated body having a free layer and a magnetization fixed layer, for example, and that has a magnetoresistive effect element (MR element) whose resistance changes according to the angle formed by the magnetization direction of the free layer in accordance with an external magnetic field with respect to the magnetization direction of the magnetization fixed layer.

The magnetoresistive effect element possessed by the above-described magnetic sensor unit has a sensitivity axis in a direction parallel to the magnetization direction of the magnetization fixed layer. By applying an external magnetic field in a direction along the sensitivity axis on the magnetoresistive effect element, a signal corresponding to the magnetic field intensity of the external magnetic field is output. Reference is made to, for example, Japanese Patent Application Publication No. 2019-117184.

SUMMARY

The present disclosure provides a magnetic sensor comprising a magnetic detection unit that outputs a signal by applying a magnetic field and a signal correction unit that corrects the signal output from the magnetic detection unit. The magnetic detection unit includes a magnetoresistive effect element, which has a predetermined sensitivity axis. The signal correction unit corrects the signal by using a correction value capable of reducing the distortion error included in the signal output from the magnetic detection unit when the magnetic field, which has an intersecting direction that obliquely intersects the sensitivity axis, is applied to the magnetoresistive effect element and generates a corrected signal.

In the above-described magnetic sensor, the magnetic detection unit may include the magnetoresistive effect element having the sensitivity axis which is parallel to a first axis. Additionally, the magnetoresistive effect element can include a first magnetoresistive effect element and a second magnetoresistive effect element, the sensitivity axis of the first magnetoresistive effect element can be parallel to a first axis, the sensitivity axis of the second magnetoresistive effect element can be parallel to a second axis, the first axis and the second axis can be mutually orthogonal, and the intersecting direction can be a direction obliquely intersecting both the first axis and the second axis.

In the above-described magnetic sensor, the signal correction unit may add to the signal an inverse distortion of the distortion error as the correction value and may generate the corrected signal by correcting the signal using the below-described Formula (1).

$$V' = V + V^3 \times a \qquad (1)$$

In Formula (1), V represents the signal output from the magnetic detection unit, V' represents the corrected signal, and a represents a correction coefficient.

The present disclosure provides an electric control device provided with the above-described magnetic sensor.

The present disclosure provides a method that, in a magnetic sensor that includes a magnetoresistive effect element having a predetermined sensitivity axis and that is provided with a magnetic detection unit that outputs a signal by applying a magnetic field to the magnetoresistive effect element, corrects the signal output from the magnetic detection unit, the correction method including a step of acquiring the signal output from the magnetic detection unit, and a step of correcting the signal acquired in the above-described step so that a distortion error included in the signal when the magnetic field having an intersecting direction that intersects the sensitivity axis is applied to the magnetoresistive effect element is reduced.

The present disclosure provides a method of manufacturing a magnetic sensor that includes a magnetoresistive effect element having a predetermined sensitivity axis and includes a magnetic detection unit that outputs a signal by a magnetic field being applied to the magnetoresistive effect element and a signal correction unit that corrects the signal output from the magnetic detection unit. The magnetic sensor manufacturing method includes a step of applying a test magnetic field in a direction intersecting the sensitivity axis of the magnetoresistive effect element on the magnetic detection unit, and a step, based on a test signal output from the magnetic detection unit corresponding to the application of the test magnetic field, of finding a correction value capable of reducing a distortion error included in the test signal.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

A further improvement in the linearity of the output signal from the magnetic sensor unit is demanded when an external magnetic field that obliquely intersects the above-described sensitivity axis (hereinafter sometimes referred to as an "oblique magnetic field") may be applied to the magnetoresistive effect element depending on the usage environment of the position detection device.

It is desirable to provide a magnetic sensor having good linearity in the output signal regardless of the direction of the applied external magnetic field, an electric control device using the same, a method for correcting the output signal of the magnetic sensor, and a method for manufacturing the magnetic sensor.

A magnetic sensor according to an embodiment of the present disclosure will be described with reference to the drawings. In this embodiment, a current sensor as a magnetic sensor will be described as an example, but the magnetic sensor according to this embodiment is not limited to a current sensor.

In describing the present example embodiment, "first axis and second axis" are defined in some drawings, as necessary. Here, the first axis is parallel to the sensitivity axis of the magnetoresistive effect element. The second axis is orthogonal to the first axis. In this specification and drawings, the first axis may be referred to as the "X axis" and the second axis may be referred to as the "V axis". In this specification, the term "orthogonal" means that two line segments, axes, directions, or the like, of interest intersect completely at 90° and also includes being substantially orthogonal, that is, intersecting at a slight deviation from 90° (the angle of intersection is within the range of 90°±5°). In addition, the term "parallel" means that two line segments, axes, directions or the like of interest are completely parallel, and includes being substantially parallel (the angle of intersection being in the range of 5° or less).

Figure 1:
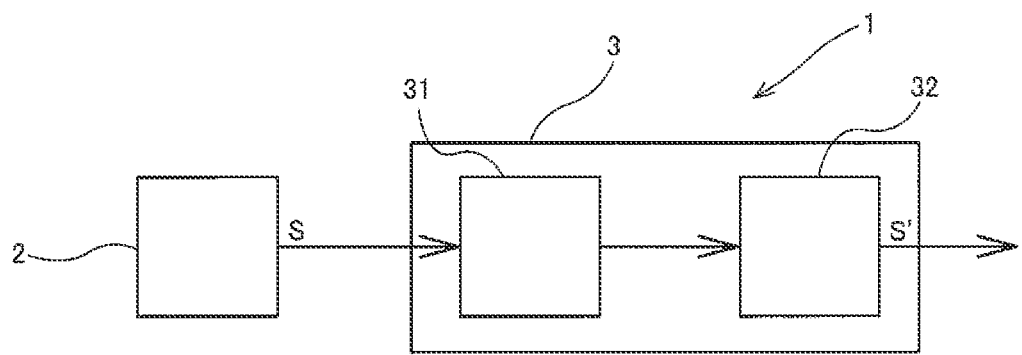
FIG. 1 is a block diagram showing a schematic configuration of a rmagnetic sensor according to an example embodiment of the present disclosure.

As shown in FIG. 1, the magnetic sensor 1 according to the present example embodiment includes a magnetic detection unit 2 that outputs a signal S through the application of a magnetic field, and a signal processing unit 3 that processes the signal S output from the magnetic detection unit 2. The magnetic sensor 1 according to the present example embodiment may be one in which the magnetic detection unit 2 and the signal processing unit 3 are integrally (monolithically) formed into one chip or one in which the magnetic detection unit 2 and the signal processing unit 3 are sealed with resin. Alternatively, the magnetic detection unit 2 and the signal processing unit 3 may be independently sealed with resin.

Figure 2A:
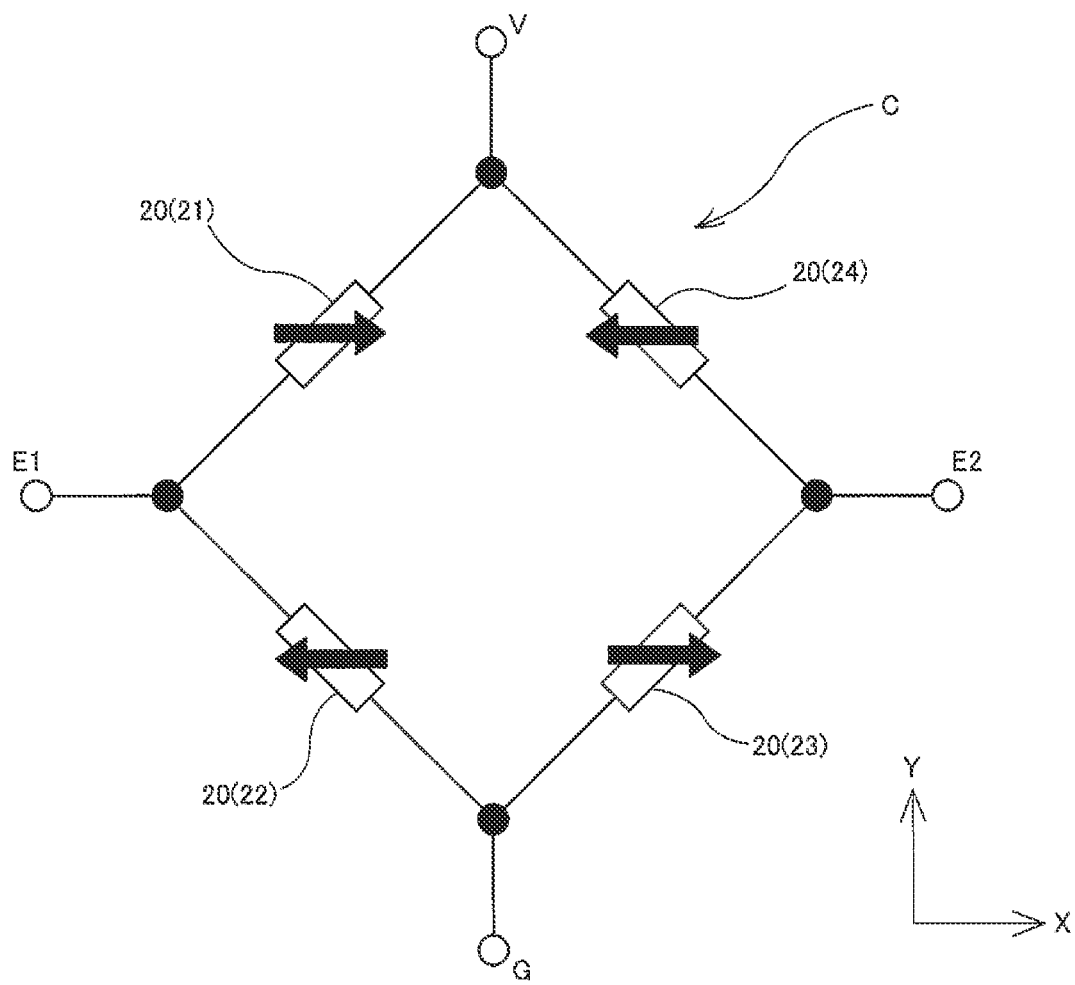
FIG. 2A is a circuit diagram showing a schematic configuration of a magnetic detection unit in an example embodiment of the present disclosure.
Figure 2B:
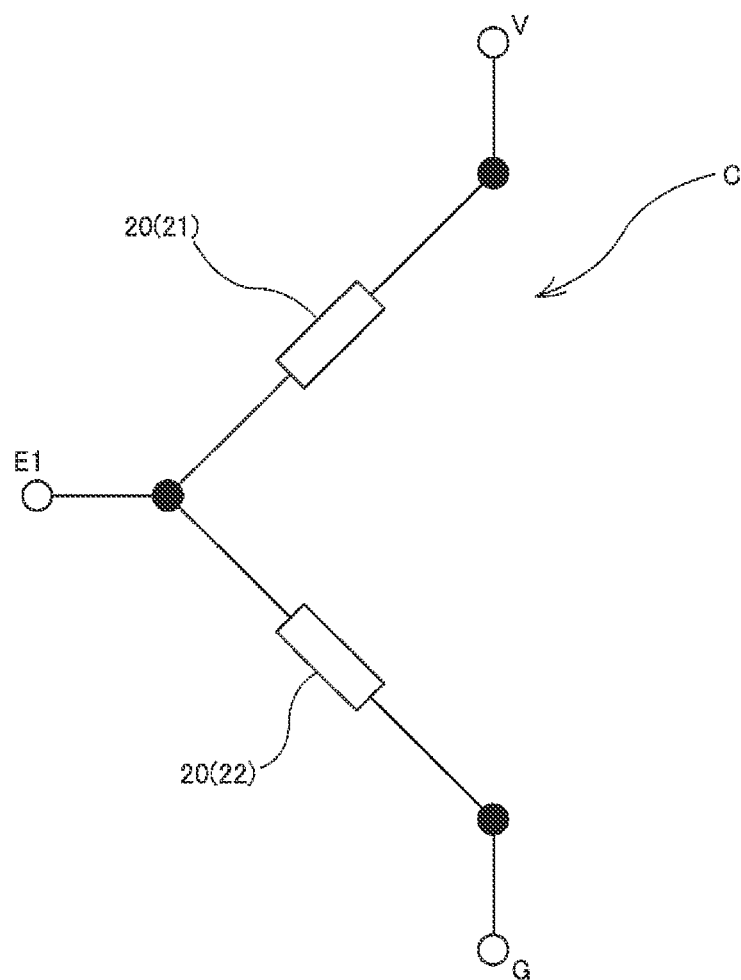
FIG. 2B is a circuit diagram showing a schematic configuration of another aspect of the magnetic detection unit in an example embodiment of the present disclosure.

As shown in FIGS. 2A and 2B, the magnetic detection unit 2 may include, for example, a plurality of element units 20 (for example, first to fourth element units 21 to 24) but may include only one element unit 20. When a plurality of element units 20 is included, the magnetic detection unit 2 may be configured in a Wheatstone bridge circuit C (a full bridge circuit (see FIG. 2A) of the first to fourth element units 21 to 24, or a half-bridge circuit (see FIG. 2B) consisting of the first element unit 21 and the second element unit 22). The Wheatstone bridge circuit C shown in FIG. 2A includes a power supply port V, a ground port G, two output ports E1 and E2, and first to fourth element units 21 to 24.

One end of each of the first element unit 21 and the fourth element unit 24 is connected to the power port V. The other end of the first element unit 21 is connected to one end of the second element unit 22 and the output port E1. The other end of the fourth element unit 24 is connected to one end of the third element unit 23 and the output port E2. The other end of each of the second element unit 22 and the third element unit 23 is connected to the ground port G. A power supply voltage of a predetermined magnitude is applied to the power supply port V, and the ground port G is connected to ground.

Figure 3:
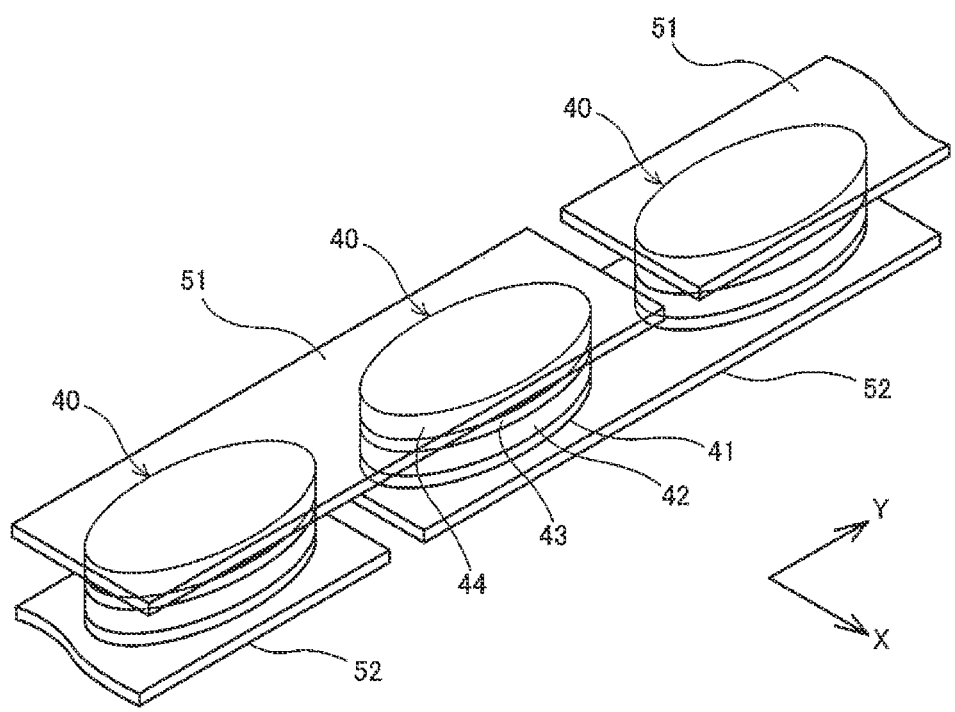
FIG. 3 is a perspective view showing a schematic configuration of a magnetoresistive effect element in an example embodiment of the present disclosure.

As shown in FIG. 3, in this embodiment the element unit 20 includes a plurality of magnetoresistive effect elements 40 connected in series. Each of the plurality of magnetoresistive effect elements 40 is, for example, a spin-valve magnetoresistive effect element, Further, in the present example embodiment, the element unit 20 includes a plurality of magnetoresistive effect elements 40 each having a substantially oval shape in a plan view and connected via first lead electrodes 51 and second lead electrodes 52 (see FIG. 3).

A spin-valve magnetoresistive effect element 40 includes an antiferromagnetic layer 41, a magnetization fixed layer 42, a nonmagnetic layer 43, and a free layer 44, which are layered in this order from the substrate side (not shown). In the embodiment shown in FIG. 3, the free layer 44 is electrically connected to the first lead electrode 51 and the antiferromagnetic layer 41 is electrically connected to the second lead electrode 52. The antiferromagnetic layer 41 is made of an antiferromagnetic material and serves to fix the magnetization direction of the magnetization fixed layer 42 by causing exchange coupling with the magnetization fixed layer 42. The magnetoresistive effect element 40 may have a structure in which the free layer 44, the nonmagnetic layer 43, the magnetization fixed layer 42 and the antiferromagnetic layer 41 are layered in this order from the substrate side. Additionally, the antiferromagnetic layer 41 may be omitted by giving the magnetization fixed layer 42 a laminated ferromagnetic structure of ferromagnetic layer/nonmagnetic intermediate layer/ferromagnetic: layer and a so-called self-pinned fixed layer (Synthetic Ferri Pinned layer, or SFP layer) that causes the two ferromagnetic layers to be antiferromagnetically coupled. In the embodiment shown in FIG. 3, the magnetoresistive effect element 40 may include a cap layer positioned between the free layer 44 and the first lead electrode 51, and a base layer positioned between the antiferromagnetic layer 41 and the second lead electrode 52. The spin-valve magnetoresistive effect element 40 may be a TMR element or a GMR element. In a TMR element, the nonmagnetic layer 43 is a tunnel barrier layer. In a GMR element, the nonmagnetic layer 43 is a nonmagnetic conductive layer. In the spin-valve magnetoresistive effect element 40, the resistance value changes according to the angle formed by the magnetization direction of the free layer 44 with respect to the magnetization direction of the magnetization fixed layer 42 and is a minimum when this angle is 0° and is a maximum when this angle is 180°.

In this embodiment, the magnetization direction of the magnetization fixed layer 42 of the magnetoresistive effect element 40 is fixed in a direction parallel to the X-axis. In the embodiment shown in FIG. 2A, the magnetization direction of the magnetization fixed layers 42 of the magnetoresistive effect elements 40 of the first element unit 21 and the third element unit 23 is the "+X direction", and the magnetization direction of the magnetization fixed layers 42 of the magnetoresistive effect elements 40 of the second element unit 22 and the fourth element unit 24 is the "−X direction". In FIG. 2A, the magnetization direction of the magnetization fixed layers 42 of the magnetoresistive effect elements 40 of the first to fourth element units 21 to 24 are indicated by arrows. The magnetization direction of the magnetization fixed layers 42 of the magnetoresistive effect elements 40 of the first to fourth element units 21 to 24 is parallel to the short axis direction or width direction of the magnetoresistive effect elements 40 which are substantially oval or substantially rectangular in the plan view. That is, the sensitivity axes of the magnetoresistive effect elements 40 of the first to fourth element units 21 to 24 are parallel to the X axis.

In the present example embodiment, the magnetization direction of the free layers 44 of the magnetoresistive effect elements 40 in the initial state (the state in which no magnetic field that is a detection target is applied to the magnetic detection unit 2) is parallel to the Y axis. In the embodiment shown in FIG. 2A, the easy axis of magnetization of the free layers 44 of the magnetoresistive effect elements 40 of the first element unit 21 and the fourth element unit 24 is the "−Y direction", and the easy axis of magnetization of the free layers 44 of the magnetoresistive effect elements 40 of the second element unit 22 and the third element unit 23 is the "+Y direction". In the present example embodiment, the easy axis of magnetization of the free layers 44 of the magnetoresistive effect elements 40 of the first to fourth element units 21 to 24 is parallel to the longitudinal axis direction of the magnetoresistive effect elements 40 having a substantially oval shape in the plan view. The easy axis of magnetization of the free layers 44 of the magnetoresistive effect elements 40 of the first to fourth element units 21 to 24 may all be the "+Y direction" or the "−Y direction." When the shape of the magnetoresistive effect elements 40 in the plan view is elongated in the direction parallel to the Y direction in the plan view, for example, a substantially oval shape or a substantially rectangular shape, the easy axis of magnetization of the free layers 44 readily becomes the "+Y direction" or the "−Y direction" due to shape magnetic anisotropy, but instead of or in addition to shape magnetic anisotropy, a bias magnetic field generator (not shown) such as a hard magnet or the like may be provided and the easy axis of magnetization of the free layers 44 may be set to the "+Y direction" or the "−Y direction" by applying a bias magnetic field on the free layers 44.

In the magnetic detection unit 2, the potential difference between the output ports E1 and E2 changes as the magnetic field is applied to each of the magnetoresistive effect elements 40 of the first to fourth element units 21 to 24, and a difference detector (not shown) outputs the signal S corresponding to the potential difference between the output ports E1 and E2 to the signal processing unit 3 as a signal representing the magnetic field strength.

The signal processing unit 3 can include an A/D (analog-digital) conversion unit 31 that converts the analog signal output from the magnetic detection unit 2 into a digital signal, and a calculation unit 32 that performs calculation processing on the digital signal converted to digital by the A/D conversion unit 31.

The signal S (analog signal) output from the magnetic detection unit 2 is converted into a digital signal by the A/D conversion unit 31, and the digital signal is input to the calculation unit 32. The calculation unit 32 performs correction processing for correcting the digital signal converted from the analog signal by the A/D conversion unit 31 to generate a corrected signal and performs calculation processing based on the corrected signal. The calculation unit 32 is configured by; for example, a microcomputer, an ASIC (Application Specific Integrated Circuit), or the like. In this embodiment, the signal processing unit 3 including the computing unit 32 or the computing unit 32 constitutes a signal correction unit.

In the magnetic sensor 1 having the above configuration, when a magnetic field parallel to the sensitivity axis (X-axis) of the magnetoresistive effect element 40 is applied to the magnetoresistive effect element 40 of the magnetism detection part 2, the output signal S output from the magnetic detection unit 2 substantially does not contain distortion errors due to high-order harmonic components such as third-order harmonic components. Note that "substantially does not contain distortion errors" means that even if the signal S contains a distortion error, the distortion error is of such a degree that it does not cause an error in the physical quantity, orientation, or the like, obtained based on the signal S. On the other hand, when a magnetic field is applied that obliquely intersects the sensitivity axis (X-axis) of the magnetoresistive effect element 40 (intersects the X-axis at an angle of more than 0° and less than 90°) and that is parallel to the XY plane (an oblique magnetic field), the signal S output from the magnetic detection unit 2 contains distortion errors due to harmonic components such as third-order harmonic components. The distortion errors contained in this signal S are distortion errors of such a degree to cause unacceptable errors in the physical quantity, orientation, or the like, obtained based on the signal S. The magnitude of the distortion errors included in the signal S depends on the angle of intersection of the oblique magnetic field with respect to the sensitivity axis (X-axis). Therefore, there is a possibility that, when the oblique magnetic field is applied to the magnetoresistive effect element 40, the output signal from the magnetic sensor 1 may change according to the angle of the oblique magnetic field with respect to the sensitivity axis (X-axis), and the linearity of the output signal from the magnetic sensor 1 may be affected.

In the magnetic sensor 1 according to the present example embodiment, even when the above-described oblique magnetic field is applied to the magnetoresistive effect element 40, the signal S output from the magnetic detection unit 2 is corrected by the calculation unit 32 of the signal processing unit 3, and a corrected signal S' is output. Therefore, the linearity of the output signal from the magnetic sensor 1 can be improved.

The signal correction processing in the calculation unit 32 will be described.

The calculation unit 32 corrects the signal S output from the magnetic detection unit2 using a predetermined correction value and generates the corrected signal S'.

The above-described correction value is a correction value that can reduce the distortion errors included in the signal S when a magnetic field that obliquely intersects the sensitivity axis (X-axis) of the magnetoresistive effect element 40 (intersects the X-axis at an angle of more than 0° and less than) 90° and that is parallel to the XY plane (an oblique magnetic field) is applied to the magnetoresistive effect element 40. Specifically, the calculation unit 32 may correct the signal S and generate the corrected signal S' according to the following formula (1), for example.

$$V' = V + V^3 \times a \tag{1}$$

In the above formula (1), V represents the signal S output from the magnetic detector 2, V' represents the corrected signal S', and a represents the correction coefficient (correction value).

When an oblique magnetic field intersects the sensitivity axis (X-axis) of the magnetoresistive effect element 40 at 45°, the distortion error included in the signal S output from the magnetic detection unit 2 exhibits a maximum value. Therefore, a, which represents the correction coefficient in the above formula (1), is preferably set as a value that can halve the distortion error included in the signal S when an oblique magnetic field that intersects the sensitivity axis (X-axis) of the magnetoresistive effect element 40 at 45° is applied to the magnetoresistive effect element 40. That is, the signal S is corrected, and the corrected signal S' is generated by adding an inverse distortion due to third-order harmonic components, so that the distortion error included in the signal S when a magnetic field parallel to the sensitivity axis (X-axis) is applied to the magnetoresistive effect element 40 and the distortion error included in the signal S when a magnetic field intersecting the sensitivity axis (X-axis) at 45° is applied to the magnetoresistive effect element 40 become the same. By setting a correction coefficient (correction value) capable of halving the distortion error included in the signal S when an oblique magnetic field intersecting at 45° is applied to the magnetoresistive effect element 40, and generating the corrected signal S' by the above formula (1), it is possible to stabilize the distortion errors included in the signal S regardless of the angle at which the magnetic field applied to the magnetoresistive effect element 40 intersects the sensitivity axis (X-axis) of the magnetoresistive effect element 40, Therefore, regardless of the angle of the magnetic field applied to the magnetoresistive effect element 40 with respect to the sensitivity axis (X-axis), the linearity of the output signal from the magnetic sensor 1 can be improved. When the signal S is corrected by adding an inverse distortion due to third-order harmonic components, preferably the distortion error included in the signal S when a magnetic field parallel to the sensitivity axis (X-axis) is applied to the magnetoresistive effect element 40 and the distortion error included in the signal S when a magnetic field that intersects the sensitivity axis (X-axis) at 45' is applied to the magnetoresistive effect element 40 become the same, but the signal S may be corrected by adding an inverse distortion due to third-order harmonic components to at least reduce the distortion error included in the signal S when a magnetic field that intersects the sensitivity axis (X-axis) at 45° is applied to the magnetoresistive effect element 40.

Figure 4:
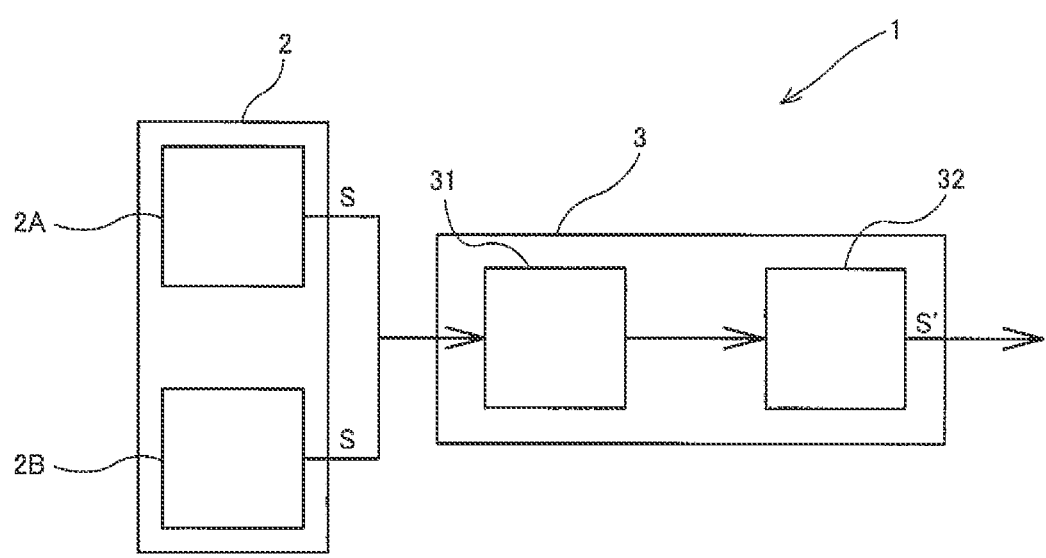
FIG. 4 is a block diagram showing a schematic configuration of another aspect of the magnetic sensor according to an example embodiment of the present disclosure.

As shown in FIG. 4, the magnetic sensor 1 according to the present example embodiment may comprise the magnetic detection unit 2 including the first magnetic detection unit 2A and the second magnetic detection unit 2B, and the signal processing unit 3. The first magnetic detection unit 2A can have a first magnetoresistive effect element 40 with a sensitivity axis parallel to the X axis, and the second magnetic detection unit 2B can have a second magnetoresistive effect element 40 with a sensitivity axis parallel to the Y axis. The first magnetic detection unit 2A is for detecting magnetic fields parallel to the X axis, and the second magnetic detection unit 2B is for detecting magnetic field parallel to the Y axis, but when a magnetic field obliquely intersecting both the X axis and the Y axis is applied to the magnetoresistive effect elements 40 of the first magnetic detection unit 2A and the second magnetic detection unit 2B, the distortion errors included in the signals S respectively output from the first magnetic detection unit 2A and the second magnetic detection unit 2B overlap, so there is a possibility that such overlapped distortion errors may affect the linearity of the output signal from the magnetic sensor 1. Because the magnetic sensor 1 according to the present example embodiment corrects the above-described signals S and generates the corrected signal S' using a correction value capable of halving the distortion errors included in the signals S respectively output from the first magnetic detection unit 2A and the second magnetic detection unit 2B when an oblique magnetic field is applied, the linearity of the output signal from the magnetic sensor 1 can be improved regardless of the angle of the magnetic field applied to the magnetoresistive effect element 40 with respect to the sensitivity axis.

The magnetic sensor 1 according to this embodiment can be manufactured, for example, as follows.

First, the first lead electrode 51, the second lead electrode 52 and the magnetoresistive effect element 40 are formed on a substrate. When forming the magnetoresistive effect element 40, the magnetization of the magnetization fixed layer 42 is fixed in a direction parallel to the short axis direction of the magnetoresistive effect element 40 which is substantially oval in the plan view.

Next, a test magnetic field that intersects the sensitivity axis (the magnetization direction of the magnetization fixed layer 42) of the magnetoresistive effect element 40 at 45° is applied to the magnetoresistive effect element 40, and a test signal output from the magnetic detection unit 2 in correspondence with the application of the test magnetic field is acquired. This test signal includes a distortion error due to the third-order harmonic components accompanying the application of the oblique magnetic field. Therefore, a correction coefficient (correction value) capable of halving the distortion error is obtained. Then, the signal processing unit 3 that stores the correction coefficient (correction value) obtained in this manner is created. Through this, the magnetic sensor 1 according to the present example embodiment can be manufactured.

The magnetic sensor 1 according to this embodiment can be provided in an electric control device. As the electric control device in this embodiment, for example a magnetic field intensity sensor, a gauss meter, an electronic compass, a linear encoder, and the like, can be cited. As described above, the magnetic sensor 1 according to the present example embodiment can output a signal with good linearity regardless of the angle of the magnetic field applied to the magnetoresistive effect element 40 with respect to the sensitivity axis. Therefore, the magnetic sensor 1 according to the present example embodiment is particularly useful as a sensor for detecting azimuth in an electronic compass that is used in an environment where a 360° magnetic field can be applied within the XY plane.

The embodiments described above are described to facilitate understanding of the present disclosure and is not described to limit the present disclosure. Therefore, each element disclosed in the above embodiment is meant to include all design changes and equivalents that fall within the technical scope of the present disclosure. Also, the dimensions and layout of each element disclosed in the above embodiment are examples and are not limiting.

EXAMPLES

Hereinafter, the present disclosure will be described in greater detail with reference to examples and the like, but the present disclosure is not limited to the following examples and the like.

Test Example 1

Figure 5:
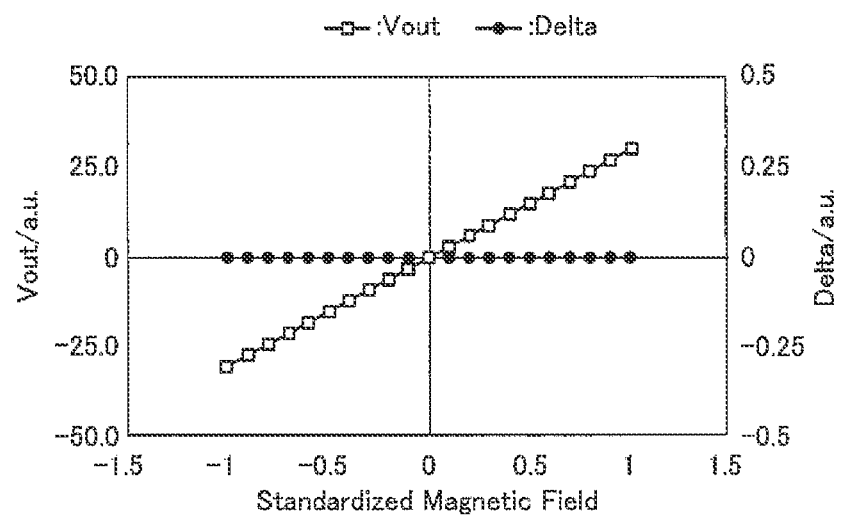
FIG. 5 is a graph showing results of Test Example 1.

In the magnetic sensor 1 having the configuration shown in FIG. 1, provided with a magnetic detection unit 2 (see FIG. 2A) that includes the magnetoresistive effect element 40 (see FIG. 3), a simulation was performed to determine the signal S output from the magnetic detection unit 2 when a magnetic field parallel to the sensitivity axis (X axis) of the magnetoresistive effect element 40 was applied. The results are shown in FIG. 5. In the graph shown in FIG. 5, the horizontal axis represents the standardized magnetic field strength (Standardized Magnetic Field) applied to the magnetoresistive effect element 40, and the vertical axis represents the output (Vout) of the magnetoresistive effect element 40 and the distortion error (Delta) caused by the third-order harmonic components. As a result, the signal S contained no distortion error due to the third-order harmonic components (Delta=0) and exhibited good linearity (see FIG. 5).

Test Example 2

Figure 6:
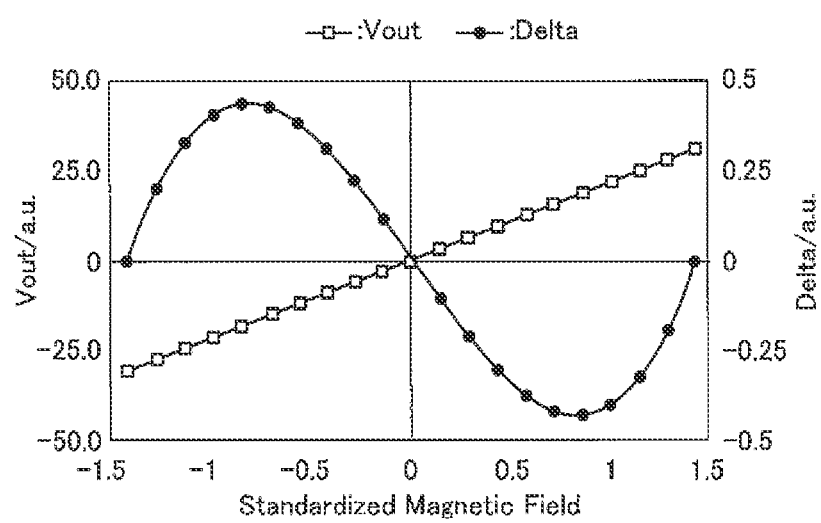
FIG. 6 is a graph showing results of Test Example 2.

In the magnetic sensor 1 of Test Example 1, a simulation was performed to determine the signal S output from the magnetic detection unit 2 when a magnetic field that intersects the sensitivity axis (X axis) of the magnetoresistive effect element 40 at 45° was applied. The results are shown in FIG. 6. In the graph shown in FIG. 6, the horizontal axis represents the standardized magnetic field strength (Standardized Magnetic Field) applied to the magnetoresistive effect element 40, and the vertical axis represents the output (Vout) of the magnetoresistive effect element 40 and the distortion error (Delta) caused by the third-order harmonic components. As a result, the signal S contained a distortion error due to the third-order harmonic components, and the linearity deteriorated compared to the signal S obtained in Test Example 1 (see FIG. 6).

Test Example 3

Figure 7:
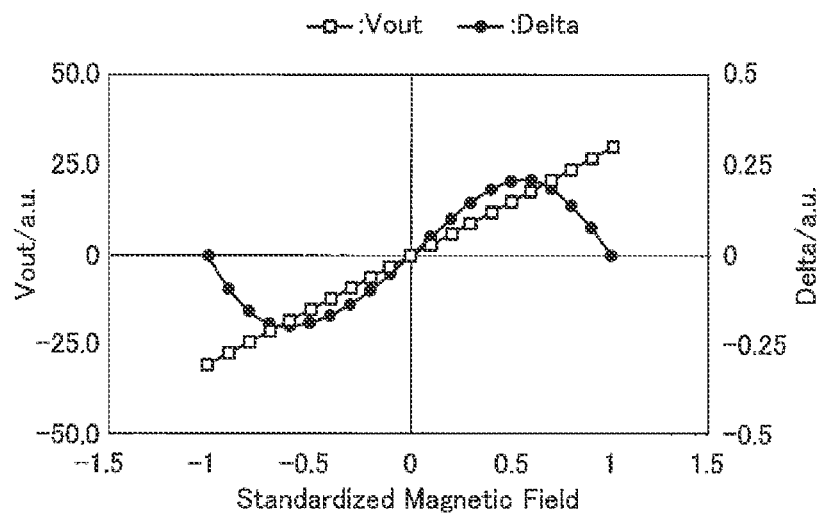
FIG. 7 is a graph showing results of Test Example 3.
Figure 8:
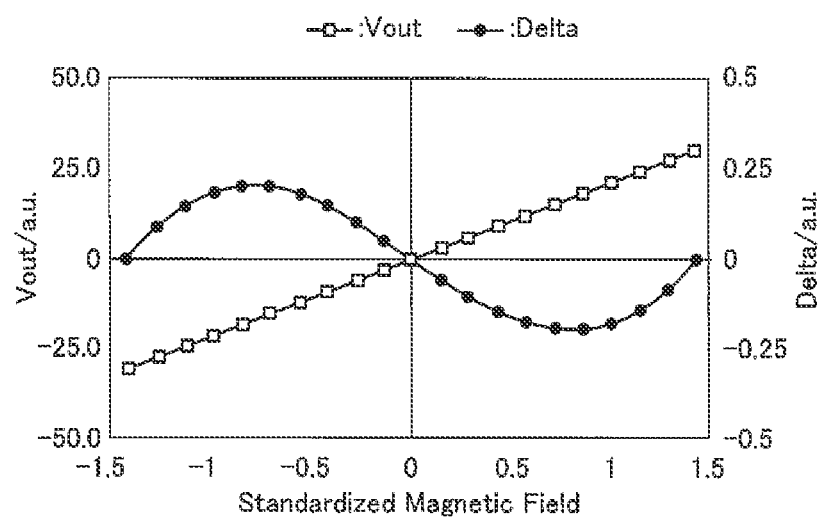
FIG. 8 is a graph showing results of Test Example 3.

A correction coefficient (correction value) that can halve the distortion error included in the signal S obtained in Test Example 2 was found, and the corrected signal S' was found by using the above formula (1) to correct the signal S obtained in Test Example 1. Similarly, the corrected signal S' was found by correcting the signal S obtained in Test Example 2. The results are shown in FIGS. 7 and 8. In the graphs shown in FIGS. 7 and 8, the horizontal axis represents the standardized magnetic field strength (Standardized Magnetic Field) applied to the magnetoresistive effect element 40, and the vertical axis represents the output (Vout) of the magnetoresistive effect element 40 and the distortion error (Delta) caused by the third-order harmonic components.

As a result, the corrected signal S' obtained by correcting the signal S found in Test Example 1 included a distortion error due to the third-order harmonic components, and the corrected signal S' obtained by correcting the signal S found in Test Example 2 included a distortion error due to the third-order harmonic components (see FIG. 7), However, the corrected signal S' obtained by correcting the signal S found in Test Example 2 exhibited good linearity compared to the signal S obtained in Test Example 2 (see FIG. 8).

The absolute value ABS of the difference (MAXEr1−MAXEr2) between the maximum value MAXEr1 (=0) of the distortion error Er1 included in the signal S obtained in Test Example 1 and the maximum value MAXEr2 of the distortion error Erg included in the signal S obtained in Test Example 2, and the absolute value ABS' of the difference (MAXEr1'−MAXEr2') between the maximum value MAXEr1' of the distortion error Er1' included in the corrected signal S' that is a correction of the signal S found in Test Example 1 and the maximum value MAXEr2' of the distortion error Er2' included in the corrected signal S' that is a correction of the signal S found in Test Example 2, were found and the two were compared. As a result, the absolute value ABS' was 0.003% of the absolute value ABS. From this result, it was found that, regardless of the angle of the magnetic field applied to the magnetoresistive effect element 40 with respect to the sensitivity axis, it is possible to improve the linearity of the output signal from the magnetic sensor 1 by correcting the signal by using a correction value (correction coefficient a) that can reduce the distortion error included in the signal S output from the magnetic detection unit 2 when an oblique magnetic field, preferably an oblique magnetic field that intersects the sensitivity axis (X axis) at an angle of 45°, is applied to the magnetoresistive effect element 40.

With the present disclosure, it is possible to provide a magnetic sensor having good linearity in the output signal regardless of the direction of the applied external magnetic field, an electric control device using the same, a method for correcting the output signal of the magnetic sensor, and a method for manufacturing the magnetic sensor.

The invention claimed is:

1. A magnetic sensor comprising:
a magnetic detection circuit including a magnetoresistive effect element having a predetermined sensitivity axis, the magnetic detection circuit being configured to output a signal by applying a magnetic field; and
a signal correction circuit configured to
receive the signal output from the magnetic detection circuit,
produce a correction value reducing a distortion error included in the signal output from the magnetic detection circuit, the distortion error being caused by the magnetic field having an intersecting direction being different from the sensitivity axis and obliquely intersecting the predetermined sensitivity axis of the magnetoresistive effect element, the correction value being computed based on the signal output when the magnetic field of the intersecting direction having a specific value is applied, and
generate a corrected signal by applying the correction value to the signal output from the magnetic detection circuit.

2. The magnetic sensor according to claim 1, wherein the predetermined sensitivity axis is parallel to a first axis.

3. The magnetic sensor according to claim 1, wherein:
the magnetoresistive effect element includes a first magnetoresistive effect element and a second magnetoresistive effect element;
the sensitivity axis of the first magnetoresistive effect element is parallel to a first axis;
the sensitivity axis of the second magnetoresistive effect element is parallel to a second axis;
the first axis and the second axis are mutually orthogonal; and
the intersecting direction is a direction obliquely intersecting both the first axis and the second axis.

4. The magnetic sensor according to claim 1, wherein the signal correction circuit adds to the signal an inverse distortion of the distortion error as the correction value.

5. The magnetic sensor according to claim 1, wherein the signal correction circuit generates the corrected signal by correcting the signal using below-described Formula (1):

$$V' = V + V^3 \times a \qquad (1)$$

where V represents "the signal output from the magnetic detection circuit", V' represents "the corrected signal" and a represents a "correction coefficient".

6. An electric control device provided with the magnetic sensor according to claim 1.

7. A method of correcting a signal output from a magnetic detection circuit, in a magnetic sensor that includes the magnetic detection circuit having a magnetoresistive effect element with a predetermined sensitivity axis, the method including:
   applying a magnetic field to the magnetoresistive effect element, the magnetic field having an intersecting direction that obliquely intersects the sensitivity axis;
   controlling the magnetic detection circuit to output a signal based on an output from the magnetoresistive effect element;
   acquiring the signal output from the magnetic detection circuit; and
   correcting the signal output from the magnetic detection circuit to reduce a distortion error included in the signal output from the magnetic detection circuit,
   the distortion error being caused by the magnetic field having the intersecting direction that obliquely intersects the sensitivity axis being applied to the magnetoresistive effect element.

8. A method of determining a correction value for a magnetic sensor that includes a magnetic detection circuit having a magnetoresistive effect element with a predetermined sensitivity axis and a signal correction circuit, the method including:
   applying a test magnetic field in a direction obliquely intersecting the sensitivity axis of the magnetoresistive effect element on the magnetic detection circuit; and
   based on a test signal output from the magnetic detection circuit corresponding to the application of the test magnetic field, finding the correction value capable of reducing a distortion error included in the test signal.

9. The magnetic sensor according to claim 1, wherein a range of the intersecting direction obliquely intersecting the predetermined sensitivity axis is 0° to 90°.

10. The magnetic sensor according to claim 1, wherein the specific value is 45°.

11. The magnetic sensor according to claim 5, wherein the correction coefficient a is a coefficient that makes equal
   a distortion error included in a signal output from the magnetic detection circuit when the magnetic field in a direction parallel to the predetermined sensitivity axis is applied to the magnetoresistance effect element, and
   a distortion error included in a signal output from the magnetic detection circuit when the magnetic field is applied to the magnetoresistive effect element from the intersecting direction in which the distortion error is maximized.

12. The magnetic sensor according to claim 5, wherein the correction coefficient a is a coefficient that reduces by half the distortion error included in the signal output from the magnetic detection circuit when the magnetic field is applied to the magnetoresistive effect element from the intersecting direction in which the distortion error is maximized.

13. The method according to claim 7, wherein a range of the intersecting direction obliquely intersecting the predetermined sensitivity axis is 0° to 90°.

14. The method according to claim 7, wherein correcting the signal includes using below-described Formula (1):

$$V' = V + V^3 \times a \tag{1}$$

where V represents "the signal output from the magnetic detection circuit", V' represents a "corrected signal" and a represents a "correction coefficient".

15. The method according to claim 8, wherein the intersecting direction has a specific value.

16. The method according to claim 8, wherein the test magnetic field intersects the sensitivity axis of the magnetoresistive effect element at 45°.

17. The method according to claim 7, wherein correcting the signal comprises applying a correction value that is computed based on the signal output from the magnetic detection circuit.

* * * * *